United States Patent Office 3,350,433
Patented Oct. 31, 1967

3,350,433
METHOD OF PREPARING VINYLETHINYL STANNANES
Nickolai Vasilievich Komarov and Iraida Sergeevna Guseva, Irkutsk, U.S.S.R., assignors to Irkutsky Institute organicheskoi Khimii, Irkutsk, U.S.S.R.
No Drawing. Filed Dec. 22, 1964, Ser. No. 420,435
2 Claims. (Cl. 260—429.7)

The present invention relates to a method of preparing vinylethinyl stannanes, which may find extensive application in the field of industrial organic synthesis and which open up broad vistas in the manufacture of novel varieties of organotin monomers and polymers suitable for the production of plastic materials, films, rubbers, adhesive cements, and the like.

Known in the art are three methods of synthesizing vinylethyinyl stannanes.

The first of these consists in reacting vinylethinyl magnesium bromide with tin trialkyl chlorides in ethereal solution. The second method involves the reaction between sodium tin trialkyl with bromovinylacetylene in liquid ammonia, whereas the third method comprises the interaction of vinylacetylene and tin trialkyl hydroxides.

The first two methods do not give high yields of the product compound, are prohibitively complicated and require the use of solvents and other materials. Fire and explosion hazards associated with these methods preclude their industrial application.

The third method, based on the interaction of vinylacetylene and tin trialkyl hydroxides, although much superior to the aforementioned procedures, is likewise not free from major shortcomings owing to the fact that tin trialkyl hydroxides, particularly those containing alkyl radicals higher than R=C$_3$H$_7$, are not readily available. Because of this shortcoming, the last method is incapable of giving a wide range of vinylethinyl stannanes.

It is an object of the present invention to provide a simple and economical method for the synthesis of vinylethinyl stannanes.

Another object of the present invention is to produce vinylethinyl stannanes from more readily available starting materials.

A further object of the present invention is to increase the yield of the product compound.

Accordingly the present invention provides a method of producing vinylethinyl stannanes by the reaction of vinylacetylene with organotin compounds having the general formula R$_3$SnOSnR$_3$, where R is an alkyl or an aryl.

Said bis-tin oxides are reacted with vinylacetylene in a molar ratio of 1:2, followed by the separation of the final product by distillation under vacuum. The reaction normally proceeds according to the reaction scheme set forth below:

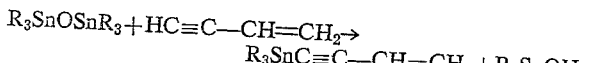

The stannols formed can easily be dehydrated to yield bis-tin oxides which are recycled. The unreacted vinylacetylene can also be recycled.

The method of this invention is economical and simple when used on a commercial scale; it requires no complicated equipment, obviates the use of solvents, involves no hazards and gives vinylethinyl stannanes in quantitative yields. The method likewise gives high yields of stannols which can be employed for the manufacture of vinylethinyl stannanes. The staring compounds, viz., vinylacetylene and organic derivatives of bis-tin oxide are readily available.

*Example 1.—Synthesis of triethyl vinylethinyl stannane*

A 20–30 ml. three-necked round-bottomed flask, furnished with a seal, a mechanical stirrer and a side tube leading to a trap for collecting vinylacetylene, is charged with a mixture of 9.9 g. (0.0225 mole) of tin hexaethyl oxide and 2.6 g. (0.05 mole) vinylacetylene. The reaction mixture is maintained at room temperature with stirring for 3 to 5 hours and then filtered to remove the crystals of triethyl stannol and distilled under vacuum. 5.03 g. (97.5% yield) of triethyl stannol, M.P. 41–42° C., are obtained, and 4.8 g. (81.6% yield) of triethyl vinylethinyl stannane, B.P. 62–63° C./2 mm., $n_D^{20}$ 1.5095, $d_4^{20}$ 1.2176.

*Example 2.—Synthesis of tri-n-propyl vinylethinyl stannane*

In the same manner as disclosed in Example 1, 14.2 g. (0.028 mole) of tin hexapropyl oxide and 18 g. of vinylacetylene are reacted to give 7.8 g. (93.98% yield) of tri-n-propyl vinylethinyl stannane, B.P. 108–109° C./5 mm., $n_D^{20}$ 1.4940; $d_4^{20}$ 1.1395; MR, 76.25 (calculated MR, 75.51).

*Analysis.*—Found (percent): C, 52.19; H, 8.11; Sn, 39.45; C$_{13}$H$_{24}$Sn. Calculated (percent): C, 52.31; H, 8.09; Sn, 39.70. Also obtained are 6.97 g. (94.96%) of a mixture of tri-n-propyl stannol and tin hexapropyl oxide, B.P. 145–146° C./2 mm.; $n_D^{20}$ 1.4930.

*Example 3.—Synthesis of tri-n-butyl vinylethinyl stannane*

By following the procedure disclosed in Example 1, 9.45 g. (0.015 mole) of tin hexabutyl oxide and 18 g. of vinylacetylene are reacted to give 4.4 g. (81.48%) of tri-n-butyl vinylethinyl stannane, B.P. 135–136° C./3.5 mm.; $n_D^{20}$ 1.4955; $d_4^{20}$ 1.0927; MR, 91.11 (calculated MR, 89.92).

*Analysis.*—Found (percent): C, 56.42; H, 8.86; Sn, 34.83; C$_{16}$H$_{30}$Sn. Calculated (percent): C, 56.34; H, 8.86; Sn, 34.80. Also obtained are 3.6 g. (74.07% yield) of a mixture of tri-n-butyl stannol and tin hexabutyl oxide, B. P. 170–175° C./3.5 mm.; $n_D^{20}$ 1.4880.

*Example 4.—Synthesis of triphenyl vinylethinyl stannane*

By following the procedure disclosed in Example 1, from the reaction mixture consisting of 1.4 g. of bis-(triphenyl tin)-oxide and 3 g. of vinylacetylene is obtained 0.41 g. (50% yield) of the product, M.P. 57–58° C.

Though the present invention is described in connection with the preferable kind of realization a person skilled in the art understands that alterations in the exact embodiment of the invention may be made within the scope of the claimed invention and without departing from the true spirit thereof.

We claim:
1. A method of synthesizing vinylethinyl stannanes which comprises reacting vinylacetylene with organic derivatives of bis-tin oxides of the general formula

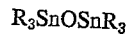

where R is a radical selected from a group containing alkyl and aryl groups.

2. A method according to claim 1, wherein bis-tin oxides and vinylacetylene are taken in a molar ratio of 1:2 respectively.

References Cited

Kosolapoff: "Chem. Abstract," vol. 57 (1962), p. 3466(h).

TOBIAS E. LEVOW, *Primary Examiner.*
W. F. W. BELLAMY, *Assistant Examiner.*